(12) United States Patent
Hance et al.

(10) Patent No.: US 10,083,406 B2
(45) Date of Patent: Sep. 25, 2018

(54) AUTONOMOUS CONDENSING OF PALLETS OF ITEMS IN A WAREHOUSE

(71) Applicant: X Development LLC, Mountain View, CA (US)

(72) Inventors: Christopher Hance, Mountain View, CA (US); Daniel Shaffer, Mountain View, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 15/947,057

(22) Filed: Apr. 6, 2018

(65) Prior Publication Data

US 2018/0232668 A1 Aug. 16, 2018

Related U.S. Application Data

(63) Continuation of application No. 15/244,845, filed on Aug. 23, 2016, now Pat. No. 9,965,730.

(51) Int. Cl.
*G06Q 10/04* (2012.01)
*B65G 61/00* (2006.01)
(Continued)

(52) U.S. Cl.
CPC .......... *G06Q 10/043* (2013.01); *B65G 57/02* (2013.01); *B65G 61/00* (2013.01); *G05B 15/02* (2013.01); *G06Q 10/087* (2013.01)

(58) Field of Classification Search
CPC ... G06Q 10/043; G06Q 10/087; B65G 1/0492
See application file for complete search history.

(56) References Cited

U.S. PATENT DOCUMENTS 7,055,741 B2 6/2006 Bong et al.
8,075,238 B2 12/2011 Wirz et al.
(Continued)

FOREIGN PATENT DOCUMENTS

JP 05-286510 A 11/1993
JP 06-171758 A 6/1994
(Continued)

OTHER PUBLICATIONS

International Search Report and Written Opinion dated Sep. 28, 2017 issued in connection with International Application No. PCT/US2017/041481 filed on Jul. 11, 2017.
(Continued)

*Primary Examiner* — Kyle O Logan
(74) *Attorney, Agent, or Firm* — McDonnell Boehnen Hulbert & Berghoff LLP

(57) ABSTRACT

Examples described may enable consolidating pallets of items in a warehouse. An example method includes receiving real-time item information including pallet locations in a warehouse and inventory of items arranged on the pallets; based on the real-time item information, identifying a set of pallets of which at least one pallet includes less than a threshold quantity of a type of item; receiving real-time robotics information and determining, based on the real-time item and robotics information, an amount of time to condense the items on the set of pallets into a single pallet and a quantity of pallets that will become empty as a result of condensing the items; and, based on the amount of time being less than a threshold time and the quantity of pallets exceeding a threshold quantity of pallets, causing robotic devices to condense the items into the single pallet.

20 Claims, 5 Drawing Sheets

(51) Int. Cl.
    *G05B 15/02*   (2006.01)
    *B65G 57/02*   (2006.01)
    *G06Q 10/08*   (2012.01)

(56)            References Cited

U.S. PATENT DOCUMENTS 8,892,241  B2   11/2014   Weiss
    8,965,562  B1    2/2015   Wurman et al.
    9,111,251  B1    8/2015   Brazeau
    9,120,622  B1    9/2015   Elazary et al.
    2004/0146380  A1   7/2004   Baker et al.
    2008/0071418  A1   3/2008   Antony et al.
    2008/0131255  A1   6/2008   Hessler et al.
    2015/0073586  A1   3/2015   Weiss
    2016/0042314  A1   2/2016   Mountz et al.
    2016/0129592  A1   5/2016   Saboo et al.
    2016/0253611  A1   9/2016   Nagahara

FOREIGN PATENT DOCUMENTS

JP         09-110115  A    4/1997
    JP       2007-008650  A    1/2007
    JP       2015-079318  A    4/2015
    KR    10-2006-0055581  A    5/2006
    KR    10-2009-0059559  A    6/2009
    WO       2015-125287  A1   8/2015

OTHER PUBLICATIONS

International Search Report and Written Opinion dated Sep. 28, 2017 issued in connection with International Application No. PCT/US2017/041484, filed on Jul. 7-11, 2017.

AUTONOMOUS CONDENSING OF PALLETS OF ITEMS IN A WAREHOUSE

CROSS-REFERENCE TO RELATED APPLICATION

The present disclosure is a continuation of U.S. patent application Ser. No. 15/244,845, filed on Aug. 23, 2016, and entitled "Autonomous Condensing of Pallets of Items in a Warehouse," the entire contents of which are herein incorporated by reference as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets—namely, flat transport structures that contain stacks of items, such as goods contained in boxes. Additionally, the warehouse may have machines or vehicles for lifting and moving goods or pallets of items, such as cranes and forklifts. Human operators may be employed to operate machines, vehicles, and other equipment. In some cases, one or more of the machines or vehicles may be robotic devices guided by computer control systems.

SUMMARY

In one aspect, the present application describes a method. The method may involve receiving, at a warehouse control system (WCS), real-time item information including real-time locations of pallets positioned in a warehouse and real-time inventory of items arranged on the pallets, where the real-time inventory of the items includes a content of each pallet. The method may further involve, based on the real-time item information, identifying a set of two or more pallets of which at least one pallet includes less than a threshold quantity of a type of item. The method may further involve receiving, at the WCS, real-time robotics information. The method may still further involve, based on the real-time item information and the real-time robotics information, determining an amount of time to condense the items on the set of pallets into a single pallet by the plurality of robotic devices. The method may still further involve, based on the real-time item information and the real-time robotics information, determining a quantity of pallets that will become empty as a result of condensing the items on the set of pallets into the single pallet. The method may yet still further involve causing, by the WCS, the plurality of robotic devices to condense the items on the set of pallets into the single pallet based on the amount of time being less than a threshold amount of time and further based on the quantity of pallets that will become empty being greater than a threshold quantity of pallets.

In another aspect, the present application describes a system. The system may comprise a plurality of robotic devices in a warehouse, at least one processor, and data storage comprising instructions executable by the at least one processor to cause the system to perform operations. The operations may include receiving real-time item information including real-time locations of pallets positioned in the warehouse and real-time inventory of items arranged on the pallets, where the real-time inventory of the items includes a content of each pallet. The operations may further include, based on the real-time item information, identifying a set of two or more pallets of which at least one pallet includes less than a threshold quantity of a type of item. The operations may further include receiving real-time robotics information. The operations may still further include, based on the real-time item information and the real-time robotics information, determining an amount of time to condense the items on the set of pallets into a single pallet by the plurality of robotic devices. The operations may still further include, based on the real-time item information and the real-time robotics information, determining a quantity of pallets that will become empty as a result of condensing the items on the set of pallets into the single pallet. The operations may yet still further include causing one or more of the plurality of robotic devices to condense the items on the set of pallets into the single pallet based on the amount of time being less than a threshold amount of time and further based on the quantity of pallets that will become empty being greater than a threshold quantity of pallets.

In still another aspect, the present application describes a non-transitory computer-readable medium having stored thereon program instructions that when executed by a computing system that includes at least one processor cause the computing system to perform operations. The operations may include receiving real-time item information including real-time locations of pallets positioned in a warehouse and real-time inventory of items arranged on the pallets, where the real-time inventory of the items includes a content of each pallet. The operations may further include, based on the real-time item information, identifying a set of two or more pallets of which at least one pallet includes less than a threshold quantity of a type of item. The operations may further include receiving real-time robotics information. The operations may still further include, based on the real-time item information and the real-time robotics information, determining an amount of time to condense the items on the set of pallets into a single pallet by the plurality of robotic devices. The operations may still further include, based on the real-time item information and the real-time robotics information, determining a quantity of pallets that will become empty as a result of condensing the items on the set of pallets into the single pallet. The operations may yet still further include causing one or more of the plurality of robotic devices to condense the items on the set of pallets into the single pallet based on the amount of time being less than a threshold amount of time and further based on the quantity of pallets that will become empty being greater than a threshold quantity of pallets.

In yet another aspect, a system is provided that includes a means for receiving real-time item information including real-time locations of pallets positioned in a warehouse and real-time inventory of items arranged on the pallets, where the real-time inventory of the items includes a content of each pallet. The system may further include a means for, based on the real-time item information, identifying a set of two or more pallets of which at least one pallet includes less than a threshold quantity of a type of item. The system may further include a means for receiving real-time robotics information. The system may still further include a means for, based on the real-time item information and the real-time robotics information, determining an amount of time to condense the items on the set of pallets into a single pallet by the plurality of robotic devices. The system may still further include a means for, based on the real-time item information and the real-time robotics information, determining a quantity of pallets that will become empty as a result of condensing the items on the set of pallets into the single pallet. The system may yet still further include a means for causing one or more of the plurality of robotic devices to condense the items on the set of pallets into the single pallet based on the amount of time being less than a threshold amount of time and further based on the quantity of pallets that will become empty being greater than a threshold quantity of pallets.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
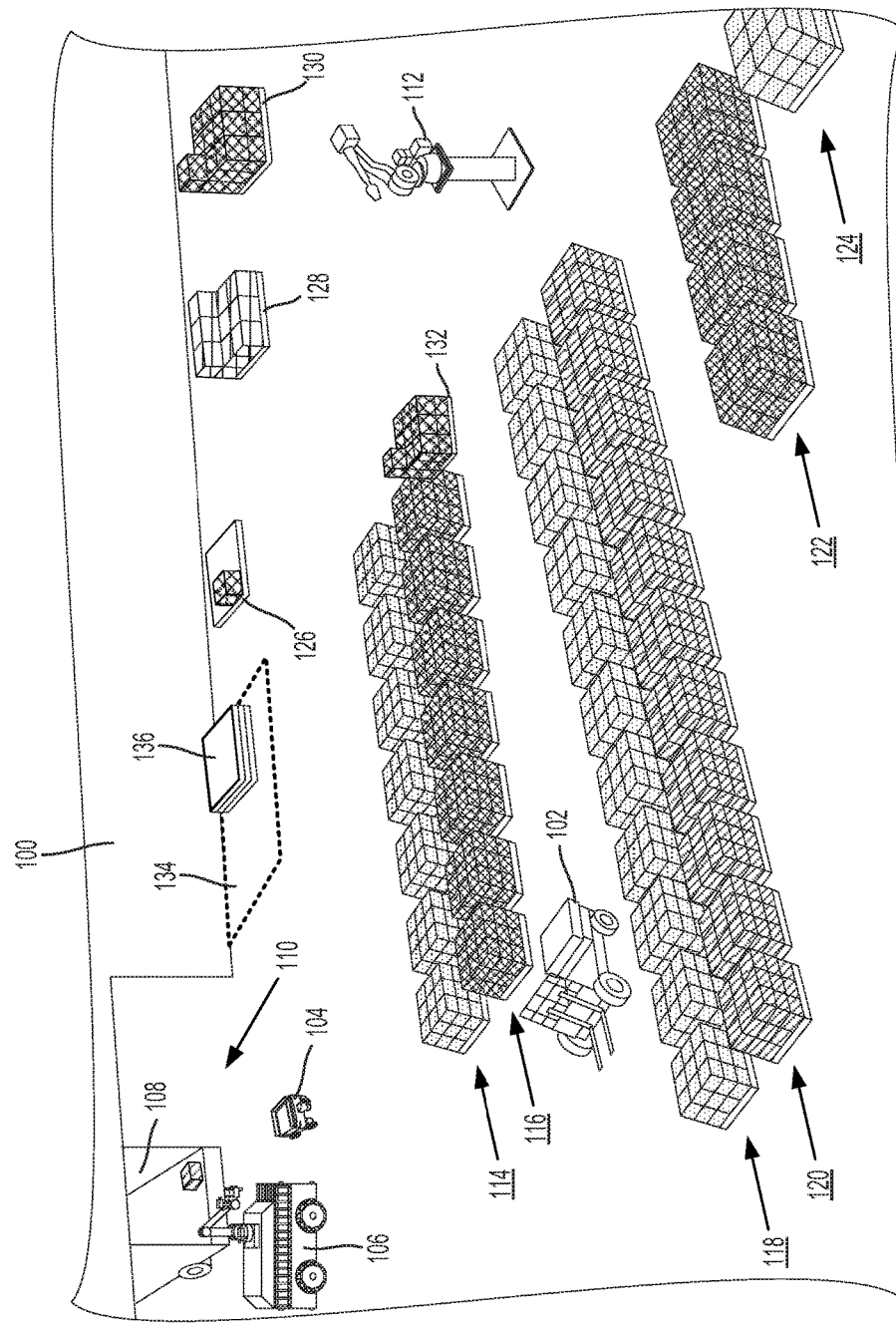
FIG. 1 depicts an example warehouse, in accordance with at least some implementations described herein.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

As used herein, the term "warehouse" may refer to any physical environment in which items or pallets of items may be manipulated, processed, and/or stored by robotic devices. In some examples, a warehouse may be a single physical building or structures. In other examples, some fixed components may be installed or otherwise positioned within the environment before or during object processing. In additional examples, a warehouse may include multiple separate physical structures, and/or may also include physical spaces that are not covered by a physical structure as well.

An example warehouse may include a homogeneous or heterogeneous group of robotic devices and a control system configured to manage the robotic devices. This group of robotic devices can exist on their own without human operators in an autonomous warehouse environment, or can be co-located with human operators (e.g., human-driven devices such as forklifts) in a collaborative warehouse environment. In the context of a warehouse, such a control system can be referred to as a warehouse control system (WCS). The warehouse may also include a variety of items (e.g., products) arranged on pallets, and the pallets may be arranged in various positions in the warehouse. For instance, pallets may be positioned directly on the floor of the warehouse, stacked on other pallets, placed in pallet racks, and/or stored in shipping containers. When each pallet arrives at the warehouse, the WCS may utilize all available information to determine the most appropriate location to store the pallet.

A group of robotic devices may be used in a warehouse setting for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of items (i.e., types of products) to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

As a general matter, the day-to-day operations in the warehouse, such as operations regarding pallets of items, may depend on various factors. Such factors may include a history of activities in the warehouse, a history of pallet locations, a history of demand for certain items, trends of items received at the warehouse, trends of items shipped out of the warehouse, received orders for items, forecasted activities in the warehouse, forecasted demand for certain items, forecasted items to be received at the warehouse, forecasted items to be shipped out of the warehouse, business goals (e.g., promotional offers such as same-day delivery), and human and/or robotic resource availability to arrange the pallets, among many other possibilities. The WCS may be configured to use these and other factors with machine learning to facilitate improved management of the warehouse.

Provided herein are example methods and systems for autonomously consolidating—or, "condensing"—pallets of items in the warehouse. In accordance with an example method, the WCS may receive, determine, or otherwise access real-time item information including real-time locations of pallets of items in the warehouse, a real-time inventory of items in the warehouse, and a real-time content of each pallet (e.g., which items are on which pallets). The WCS may use this information discussed above to identify a set of two or more pallets in the warehouse of which at least one pallet includes less than a threshold quantity of items. In this manner, the WCS can efficiently locate pallets that do not have many items on them but are taking up space in the warehouse, and then select them as candidates for condensing. By way of example, the WCS may locate (i) a first pallet that has only two television boxes on it, (ii) a second pallet that has one television box on it, and (iii) a third pallet that has six television boxes on it. But by comparison, in this example, the average pallet in the warehouse (among all pallets in the warehouse, or among a smaller group of pallets having distinct characteristics) may be configured to carry up to ten boxes of a television product (e.g., a 55-inch LED television set). In other words, the average pallet may have a capacity of ten. By consolidating these three pallets, a single pallet of nine television boxes would result, thus eliminating two pallets in the warehouse.

As a general matter, in determining whether, when, and how to condense the set of pallets the WCS may make various considerations. As an example, the WCS may determine what resources would be needed to condense the identified set of pallets, such as the time it would take for robotic devices to condense the set of pallets. If the WCS determines that resources meet certain criteria, the WCS may then instruct the robotic devices to condense the set of pallets. If not, the WCS may not instruct the robotic devices the set of pallets until the WCS determines that the resources meet certain criteria. As another example, the WCS may not instruct the robotic devices to condense the set of pallets unless a certain threshold quantity of pallets will become empty as a result of the condensing, thereby making more room in the warehouse for pallets of items that are more full.

To facilitate the WCS's determination of available robotic resources, the WCS may receive, determine, or otherwise have access to real-time robotics information relating to robot activities in the warehouse. In particular, the real-time robotics information may include real-time locations of the robotic devices, real-time task progress updates for robotic tasks that are in-progress and/or to-be-completed, a task schedule, and respective fixed measurements of how much time the robotic devices will take to perform various tasks, among other possible information. The WCS may then use at least the real-time robotics information to determine how long it would take the robotic devices to condense the set of pallets. If the amount of time is less than a threshold amount of time, the WCS may instruct the robotic devices to condense the set of pallets.

Dynamically and autonomously condensing pallets in the warehouse may provide various industrial and business advantages. For example, the use of the WCS and robotic devices may greatly reduce or eliminate the need for human labor in condensing pallets in the warehouse. As another example, as demand for items changes over time, the WCS may choose to condense (or not condense) sets of pallets to best reflect the current demand at various points in time, or may proactively change the layout of pallets to best reflect forecasted demand at a future point in time. For instance, when items are not selling very well, it may be desirable to condense pallets of those items to make more room for items that are selling well. As yet another example, as available space in the warehouse increases and decreases, the WCS may balance a consideration of available space with other considerations, such as demand, ease of access to items, etc., in order to determine which pallets should be condensed to best utilize the available space in the warehouse in light of those considerations. Other examples are possible as well.

It should be noted that in alternate implementations, one or more computing entities associated with the warehouse, such as the WCS and/or other computing systems, may gather, update, process, and/or provide for receipt by the WCS the item information and/or the robotics information less frequently than in real-time.

Reference will now be made in detail to various implementations, examples of which are illustrated in the accompanying drawings. In the following detailed description, numerous specific details are set forth in order to provide a thorough understanding of the present disclosure and the described implementations. However, the present disclosure may be practiced without these specific details. In other instances, well-known methods, procedures, components, and circuits have not been described in detail so as not to unnecessarily obscure aspects of the implementations.

Referring now to the figures, FIG. 1 depicts an example warehouse 100 in accordance with at least some implementations described herein. The warehouse 100 includes various types of robotic devices that may be controlled to collaborate to perform tasks related to the processing of items, pallets, etc. within the warehouse. Certain example types and numbers of different robotic devices are shown here for illustration purposes, but the warehouse may employ more or fewer robotic devices, may omit certain types shown here, and may also include other types of robotic devices not explicitly shown.

One example type of robotic device shown in FIG. 1 is an autonomous fork truck 102, a mobile device with a forklift that may be used to transport pallets of boxes and/or to lift pallets of boxes (e.g., to place the pallets onto a rack for storage). Another example type of robotic device shown is an autonomous guided vehicle (AGV) 104, which may be a relatively small, mobile device with wheels that may function to transport individual items or other objects from one location to another within the warehouse. An additional example type of robotic device is a robotic truck loader/unloader 106, a mobile device with a robotic manipulator as well as other components such as sensors to facilitate loading and/or unloading items and/or pallets onto and/or off of trucks or other vehicles. For instance, robotic truck unloader 106 may be used to load pallets or individual items onto delivery truck 108, which is located at a shipping dock 110 of the warehouse. In some examples, movements of delivery truck 108 (e.g., to deliver packages to another warehouse) may also be coordinated with robotic devices in the warehouse.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

Any of the robotic devices described herein may include one or more sensor(s) such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, audio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) may provide sensor data to a processor(s) to allow for appropriate interaction of a robotic device with the environment. Additionally, a robotic device may also include one or more power source(s) configured to supply power to various components of the robotic device. Any type of power source may be used such as, for example, a gasoline engine or a battery.

In further examples, the warehouse 100 may also include various fixed components. One or more fixed robotic devices may be used to move or otherwise process items. For instance, a pedestal robot 112 may include a robotic arm elevated on a pedestal that is fixed to the ground floor within the warehouse. The pedestal robot 112 may be controlled to distribute items between other robots and/or to stack and unstack pallets of items. For example, the pedestal robot 112 may pick up and move boxes from nearby pallets and distribute the items to individual AGV's 104 for transportation to other locations within the warehouse.

In further examples, the warehouse 100 may include additional fixed components, such as storage racks (not shown) that may be used to store pallets and/or other objects within the warehouse. Such storage racks may be designed and positioned to facilitate interaction with a robotic device, such as autonomous fork truck 102. In addition to or alternative to storage racks, certain ground space in the warehouse 100 may be selected and used for storage of pallets. For instance, some pallets may be positioned within the warehouse environment at chosen locations for certain periods of time to allow the pallets to be picked up, distributed, or otherwise processed by a robotic device. Any fixed component in warehouse 100 may be equipped with one or more sensors, as described herein.

In some examples, any or all of the robotic devices in the warehouse 100 may include one or more sensors, one or more computers, and one or more robotic arms. A sensor may be used to perform various operations, such as scanning areas within the warehouse 100 in order to capture visual data and/or three-dimensional (3D) depth information. Data from a scan may then be integrated into a representation of larger areas in order to provide digital environment reconstruction. In additional examples, the reconstructed environment may then be used for identifying items, pallets, or other objects to pick up, determining pick positions for items or pallets, and/or planning collision-free trajectories along which robotic devices should travel. The warehouse 100 may also include sensors such as cameras or other types of sensors that are not connected to robotic devices. For instance, various sensors may be affixed to various locations in the warehouse, such as the walls, ceilings, etc.

As shown in FIG. 1, the warehouse 100 includes a variety of pallets, each of which may contain one type of item or may contain multiple types of items. In particular, the warehouse 100 includes rows 114, 116, 118, 120, 122, and 124, each of which includes a line of pallets that contain the same type of item. For instance, the pallets of row 114, row 118, and row 124 may each include a first type of item, the pallets of row 116 and row 122 may each include a second type of item, and the pallets of row 120 may each include a third type of item. Alternatively, within any of the rows, adjacent pallets may have different types of items from one another. As a general matter, any two adjacent pallets in the warehouse—including adjacent pallets in the same row or adjacent pallets in two adjacent rows—may or may not have the same type of item.

The pallets in rows 114, 116, 118, 120, 122, and 124 may be considered "full" pallets—namely, pallets that contain the maximum quantity of items allotted per pallet. The maximum quantity of items allotted per pallet may be the same or different for multiple pallets, and may be a quantity defined by the WCS or by a human. Further, the maximum quantity of items allotted per pallet—or, "capacity"—may depend on various factors, such as pallet structure (e.g., the maximum weight that a pallet can support) and the size and weight of the items on the pallet. Still further, the capacity may be the same across all pallets in the warehouse or may be different for respective groups of pallets. For instance, pallets for 55-inch televisions may have a smaller capacity than pallets for spark plugs since boxes for televisions are likely to be larger than boxes for spark plugs. In practice, the capacity for a given pallet or group of pallets may be determined in various ways. The WCS may itself determine what the capacity should be or may receive such capacity information from another computing entity or from manual input from a human operator.

By comparison, the warehouse 100 may also include various pallets that are less than full, such as pallet 126, pallet 128, pallet 130, and pallet 132. Each of these pallets may include the same type of item or may include different types of items.

In some examples, the warehouse 100 may additionally include a dedicated region for performing certain tasks, such as a pallet condensing station 134, which is shown to be next to shipping dock 110. In an example scenario, the WCS may instruct autonomous fork truck 102 and/or other robotic devices truck to retrieve two or more pallets that are not at capacity and bring them to pallet condensing station 134 to condense the pallets into a single pallet. To facilitate this, pallet condensing station 134 may include empty pallets 136 on which to place the condensed items. In other implementations, a pallet condensing station may take other forms and/or be located in another area or areas of warehouse 100.

In further examples, the warehouse 100 may additionally include battery exchange/charging stations (not shown). Within examples, some or all of the mobile robotic devices such as autonomous fork truck 102 or AGV 104 may periodically receive charged batteries from a battery exchange station equipped with multiple battery chargers. In particular, the battery exchange station may replace a robotic device's old batteries with recharged batteries, which may prevent robotic devices from having to sit and wait for batteries to charge. The battery exchange station may be equipped with a robotic manipulator such as a robotic arm. The robotic manipulator may remove batteries from an individual mobile robotic device and attach the batteries to available battery chargers. The robotic manipulator may then move charged batteries located at the battery exchange station into the mobile robotic device to replace the removed batteries. For instance, an AGV with a weak battery may be controlled to move over to a battery exchange station where a robotic arm pulls a battery out from the AGV, puts the battery in a charger, and gives the AGV a fresh battery.

Within examples, one or more robotic devices may be brought into the warehouse 100 to create a map of the warehouse 100 space before determining placement of other objects, such as any fixed robotic devices or components discussed above, as well as any pallets. Herein, a "map" refers to information representative of a positioning of elements in a particular area of an environment, and/or representative of a relationship of certain elements to other elements or to the environment. Within example implementations, a map is a digital map, determined by collecting and compiling data representative of relationships between elements in the given environment, and then formatting such data into a virtual form, such as a virtual 2D or 3D image. A map can be a real-time or non-real-time representation of the elements and environment at issue, detailing such elements, the environment, and/or points of interest on such elements and/or in the environment. Additionally or alternatively, at least a portion of a map can be generated through non-robotic means, using traditional or digital surveying techniques, or using other techniques.

Once map information is available, a computing system such as the WCS may determine (e.g., by running simulations) how to layout such components within the space available. In certain cases, a layout may be chosen to minimize the amount of space taken up by the objects. Pallets can be placed at predetermined locations, or can be placed at random, or can be intelligently positioned by the WCS based on consideration of various factors, including factors discussed herein.

To coordinate actions of various devices within the warehouse 100 (e.g., the robotic devices, and possibly other components such as a battery charging station, remotely-controlled shipping dock doors, remotely-controlled ramps, etc.), a global control system, such as a remote, cloud-based server system, may communicate (e.g., through wireless communication) with some or all of the components and/or with separate local control systems of individual components. Any computing system described herein, such as a WCS, may take the form of such a global control system.

Figure 2:
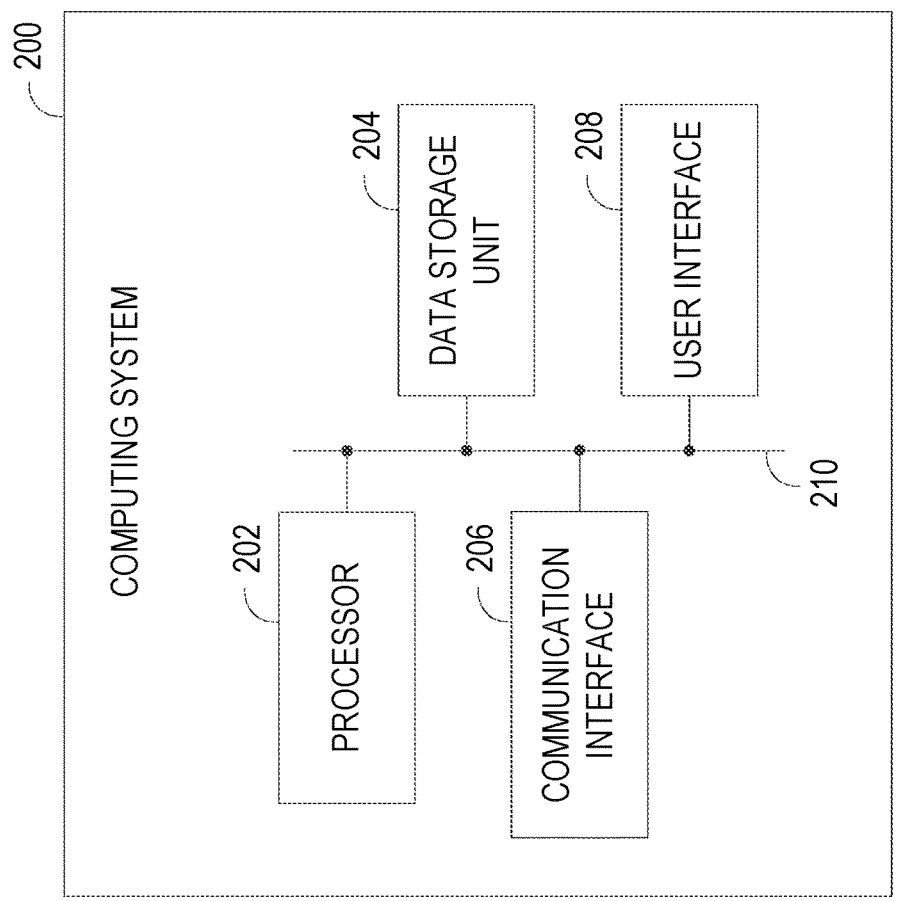
FIG. 2 is a simplified block diagram illustrating components of an example computing system, in accordance with at least some implementations described herein.

FIG. 2 is a simplified block diagram illustrating components of an example computing system 200, in accordance with at least some implementations described herein. For instance, computing system 200 can serve as a WCS and control aspects of a warehouse such as warehouse 100, including dynamically controlling operations of robotics devices or other components in the warehouse, as noted above. As such, computing system 200 can include various components, such as processor 202, data storage unit 204, communication interface 206, and/or user interface 208. The components of computing system 200 can be connected to each other (or to another device, system, or other entity) via connection mechanism 210. In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless). Computing system 200 can include more or less components in other example implementations.

Processor 202 may take the form of a general-purpose processor (e.g., a microprocessor) and/or a special-purpose processor (e.g., a digital signal processor (DSP)). In some instances, computing system 200 may include a combination of processors.

Data storage unit 204 may include one or more volatile, non-volatile, removable, and/or non-removable storage components, such as magnetic, optical, or flash storage, and/or can be integrated in whole or in part with processor 202. As such, data storage unit 204 may take the form of a non-transitory computer-readable storage medium, having stored thereon program instructions (e.g., compiled or non-compiled program logic and/or machine code) that, when executed by processor 202, cause computing system 200 to perform one or more acts and/or functions, such as those described in this disclosure. Computing system 200 can be configured to perform one or more acts and/or functions, such as those described in this disclosure. Such program instructions can define and/or be part of a discrete software application. In some instances, computing system 200 can execute program instructions in response to receiving an input, such as from communication interface 206 and/or user interface 208. Data storage unit 204 may also store other types of data, such as those types described in this disclosure.

Communication interface 206 can allow computing system 200 to connect to and/or communicate with another other entity according to one or more protocols. In an example, communication interface 206 can be a wired interface, such as an Ethernet interface or a high-definition serial-digital-interface (HD-SDI). In another example, communication interface 206 can be a wireless interface, such as a cellular or Wi-Fi interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 208 can facilitate interaction between computing system 200 and a user of computing system 200, if applicable. As such, user interface 208 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 208 can include hardware and/or software components that facilitate interaction between computing system 200 and the user of the computing device system.

As indicated above, computing system 200 may be configured to dynamically control aspects of a warehouse, such as by coordinating operation of robotic devices operating in the warehouse. As an example, computing system 200 may determine for a given robotic device a schedule that indicates a series of tasks for the robotic device to perform throughout an entire period of time (e.g., 12 hours) and adjust the schedule using subsequent information received from the robotic device (e.g., sensor data, task progress updates), other robotic devices, and/or other systems (e.g., a sensor system) positioned in the warehouse. As another example, computing system 200 may be configured to coordinate operations for multiple robotic devices, including aligning schedules so that two or more robotic devices are located in the same area during a period of time, perhaps in case the computing system has predicted that the two or more robotic devices may be needed to assist with another task in that area during that time. As yet another example, computing system 200 may also arrange schedules so as to not have a threshold high amount of robotic devices performing tasks in the same area during the same period of time, thereby avoiding generation of excess traffic in the warehouse. As yet another example, computing system 200 may alter the schedules of one or more robotic devices to save resources, such as by cancelling a first robotic device's scheduled pickup of a pallet when a second robotic device is closer in distance to the pallet than the first robotic device, and instead instructing the second robotic device to pick up the pallet.

In some implementations, computing system 200 may be integrated with a warehouse management system (WMS). Through this integration, computing system 200 may access various types of information maintained by the WMS, such as warehouse inventory information, demand/order information, expected inbound receiving/delivery information, expected outbound shipping information, and/or other types of information discussed herein. In other implementations, computing system 200 itself may function as a WMS. As such, computing system 200 may gather and maintain this and/or other information.

In some examples, computing system 200 may function as or include a central planning system that assigns tasks to different robotic devices. Herein, a "task" refers to an operation that is assigned to at least one entity for that entity or entities to perform. Within example implementations, such a task is assigned to the at least one entity by a system that monitors, governs, or otherwise manages the at least one entity in order to facilitate a performance of the task by the at least one entity.

The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate aspects of the geometry and physics of box picking, packing, or storing.

Planning control may also be distributed across individual system components. For example, computing system 200 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

To facilitate planning control, computing system 200 may employ various techniques to monitor the locations of robotic devices in the warehouse 100. These locations may be real-time locations or non-real-time locations. To further facilitate planning control, in some implementations, robotic devices may be configured to continuously or periodically "publish" (e.g., transmit) their locations or the locations of other robotic devices to computing system 200 so that computing system 200 can in turn update the locations of the robotic devices. Computing system 200 and/or the robotic devices can employ other techniques as well to facilitate monitoring locations of the robotic devices.

In additional examples, computing system 200 may employ various techniques to monitor the real-time inventory of the pallets in the warehouse 100 and/or the real-time locations of the pallets. For instance, computing system 200 may instruct one or more mobile robotic devices with vision systems to travel the warehouse and identify the location and content of each pallet. Such information may be gathered by way of scanning barcodes or other labels on the individual pallets or individual items, as discussed below, or in other manners. Further, while a robotic device is transporting a pallet and repeatedly publishes its own location in real-time during transportation of the pallet, the WCS may interpret the real-time location of the robotic device to be the location of the pallet as well. Still further, after a robotic device drops off the pallet somewhere in the warehouse, the robotic device may notify the WCS of the new location of the pallet. Computing system 200 and/or the robotic devices can employ other techniques as well to facilitate monitoring locations and contents of the pallets.

In additional examples, a central planning system may be used in conjunction with local vision systems on individual robotic devices to coordinate functions of various robotic devices. For instance, a central planning system may be used to get robotic devices at least relatively close to where they need to go (e.g., within millimeters or centimeters). However, it may be difficult for the central planning system to command robots with millimeter precision, unless the robotic devices are bolted to rails or other measured components are used to precisely control robot positions. Local vision systems and planning for individual robotic devices may therefore be used to allow for elasticity between different robotic devices. A general planner may be used to get a robotic device close to a target location, at which point local vision system of the robotic device may take over. In some examples, most robotic functions may be position-controlled to get the robots relatively close to target locations, and then vision systems and handshakes may be used when needed for local control.

A visual handshakes may enable two robotic devices to identify one another by quick response (QR) tag or other characteristics, and to perform collaborative operations within the warehouse 100. In additional examples, an item may be provided with a visual tag as well or instead. A visual tag may be used by a robotic device to perform an operation on the item using a local vision system. In particular, a tag may be used to facilitate manipulation of an item by a robotic device. For instance, a tag on a location on a pallet may be used to inform a forklift where or how to lift up the pallet.

Within additional examples, robotic devices may use their local vision systems to scan and identify individual items or pallets of items during tasks in which robotic devices need to manipulate the items/pallets in some manner. To facilitate this in part, for instance, a given item/pallet may include a machine-readable code (e.g., QR code or barcode) having encoded information about the given item/pallet. As a result of the scanning, the machine-readable code may provide a robotic device's local computing system and/or computing system 200 with the information about the given item/pallet. For instance, for a pallet, such information may include what type of item the pallet carries. Further, such information may include a history of the pallet, such as (i) where in the warehouse the pallet has been, (ii) how many times the pallet has been moved, (iii) when the pallet was moved, (iv) indications of damage to the pallet, if any, and (v) whether the pallet is marked for delivery to another area of the warehouse (e.g., a shipping dock, or for storage in another area), among other types of information. A given item/pallet may additionally or alternatively include a label or other source of such information that the robotic device can scan to identify the item/pallet and obtain such information.

Scanning items/pallets in this manner may have various advantages, such as locating and keeping track of items/pallets as they are moved into, out of, and around the warehouse 100. Further, a potential benefit of such scanning is added transparency, both on the supplier side and the consumer side. On the supplier side, for example, information about current locations of inventory may be used to avoid overstocking and/or to move items/pallets to different locations or warehouses to anticipate demand. On the consumer side, for example, the information about current locations of items may be used to determine when an item/pallet will be delivered with improved accuracy.

Within additional examples, computing system 200 may over time optimize deployment and/or planning strategies for fixed and/or mobile components. For instance, computing system 200 (e.g., a cloud-based server system) may incorporate data and information from individual robotic devices within the warehouse and/or from external sources. Strategies may then be refined over time to enable the robotic devices to use less space, less time, less power, less electricity, or to optimize across other variables. In some examples, optimizations may span across multiple warehouses, possibly including other warehouses with other robotic devices and/or traditional warehouses without such robotic devices. For instance, computing system 200 may incorporate information about delivery vehicles and transit times between facilities into central planning.

Similarly, computing system 200 may over time optimize planning strategies to meet existing demand for items (e.g., current orders for products), meet forecasted demand for items, meet certain business goals, etc.

In some examples, a central planning system may sometimes fail, such as when a robotic device gets stuck or when items get dropped in a location and lost. Local vision systems may also therefore provide robustness by inserting redundancy to handle cases where the central planner fails. For instance, as an automated pallet jack passes and identifies an item, the pallet jack may send information up to a remote, cloud-based server system. Such information may be used to fix errors in central planning, help to localize robotic devices, or to identify lost items.

In further examples, computing system 200 may dynamically update a map of the warehouse 100 and objects undergoing processing by the robotic devices. In some examples, the map may be continuously updated with information about dynamic objects (e.g., moving robotic devices and items/pallets moved by robotic devices). In additional examples, a dynamic map could contain information on both the current arrangement of objects within a warehouse (or across multiple warehouses) as well as information about what is anticipated in the future, such as in the near term (e.g., in upcoming seconds, minutes, hours, or even days) or long term (e.g., in upcoming weeks, months, or even years). For instance, the map could show current locations of moving robotic devices and anticipated locations of the robotic devices in the future, which may be used to coordinate activity between robotic devices. The map could also show current locations of items undergoing processing as well as anticipated future locations of the items (e.g., where an item is now and when the item is anticipated to be shipped out). Further, the map could show anticipated locations of items that have yet to arrive at the warehouse. For instance, computing system 200 may consider a history of orders for items, forecasted orders, a history of pallet relocation, and/or other known or predicted information to cause the map to show where pallets of items should be placed in the warehouse when they arrive.

In line with the discussion above, computing system 200 may also schedule battery exchanges. For instance, individual mobile robotic devices may be configured to monitor their battery charge status. The robotic devices may send information to computing system 200 indicating the status of their batteries. This information may then be used by computing system 200 to schedule battery replacements for individual robotic devices when needed or convenient.

Figure 3:
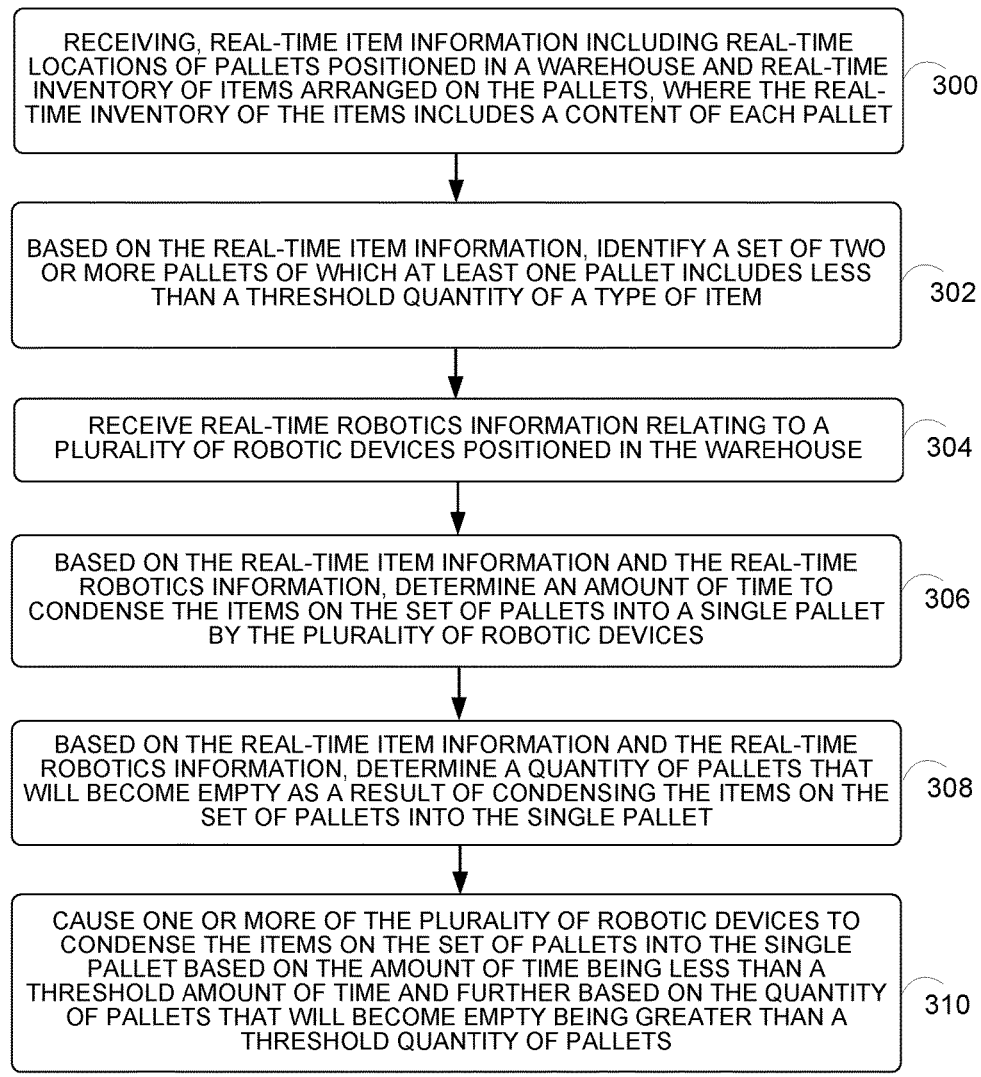
FIG. 3 is a flow chart of an example method, in accordance with at least some implementations described herein.

FIG. 3 is a flow chart of an example method, in accordance with at least some implementations described herein. The method shown in FIG. 3 presents an implementation of a method that, for example, could be used with the systems shown in FIGS. 1 and 2, for example, or may be performed by a combination of any components of those Figures. In addition, such an implementation of a method could be carried out in accordance with the aspects illustrated in FIGS. 4A, 4B, and 4C. The method may include one or more operations, or actions as illustrated by one or more of blocks 300-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

Furthermore, for the method and other processes and methods disclosed herein, the flowchart shows operation of one possible implementation. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 3 may represent circuitry that is wired to perform the specific logical operations in the process.

Operations of the method, and operations of other methods and processes disclosed herein, are described as performed by a WCS in some examples, such as computing system 200. However, these operations may be performed in whole or in part by other entities or combinations of entities. For example, these operations may be managed by a central server, which can distribute operations to smaller peer-to-peer networks or servers that may manage portions of the robotic devices.

Within examples, some or all of the operations of this method or other methods may be performed in response to various trigger events. For example, the WCS may determine that a present or future storage capacity requirement is not met, such as an amount of space taken up in the warehouse by the pallets exceeding a threshold amount of space, and the WCS may responsively then take certain actions to condense pallets in the warehouse to reduce the space taken up by the pallets. As another example, the WCS may take certain actions to condense pallets of items if an outbound throughput of items does not meet certain throughput requirements.

As a general matter, there may be various viable strategies for pallet condensing that might lead to different outcomes, such as consolidating two partial pallets to one partial pallet, consolidating two partial pallets to one full pallet, consolidating two partial pallets to a full pallet and one partial pallet (e.g., if there is an expectation that a full pallet of an item will be shipped), consolidating two partial pallets having different quantities of an item to two partial pallets both having the same quantity of the item, etc. Any one or more of the operations discussed herein may be used to facilitate any one or more of these strategies or other strategies for condensing pallets.

Within additional examples, the WCS may have access to various records/histories, such as inventory history, pallet relocation history, receiving records, order fulfillment records, shipping records, and the like from various points in time, ranging from minutes to weeks or months in the past, for instance. The WCS may use such records/histories to determine the expectations of items to be received at the warehouse, the expectations of items to be shipped out of the warehouse, and/or other possible information for use in accordance with the method. An "expectation" may be a prediction (with some degree of uncertainty) or may be a certainty. In other words, the WCS may maintain or be provided with existing information such as receiving records, order fulfillment records, shipping records, etc. that may directly indicate to the WCS what items will be received/shipped/etc. in the future, or that the WCS may use with machine learning as a basis for predicting what items will be received/shipped/etc. in the future. For example, if the WCS has access to orders received for an item that is due to be shipped out in a day, the expectation for that item is that the item will be shipped out in a day. By contrast, for example, if the WCS has access to records indicating that many recent orders for an item have come in, or has access to any other information indicating that the item may be in somewhat high demand, the WCS may predict, and thereby expect, that a certain quantity of the item will be arriving at the warehouse and/or shipped out of the warehouse sometime within the upcoming week.

The WCS may use any or all of the various records/histories and determined expectations discussed above to facilitate any one or more of the operations discussed herein, including at least a portion of the method discussed with regard to FIG. 3.

There may be scenarios in which the WCS needs to perform multiple condensing tasks to achieve certain goals, such as freeing up a large amount of storage space in the warehouse. Accordingly, references to the act of identifying and condensing "a set of pallets" may involve the identifying and condensing one large set of pallets (e.g., twenty, fifty, or one hundred pallets) or multiple sets of pallets (e.g., multiple sets of pallets having the same item or multiple sets of pallets having different items). Alternatively, identified/condensed sets of pallets may be smaller (e.g., two, five, or ten pallets).

At block 300, the method involves receiving real-time item information including real-time locations of pallets positioned in a warehouse and real-time inventory of items arranged on the pallets, where the real-time inventory of the items includes a content of each pallet.

The real-time inventory of the items may specify the content of the pallets with varying granularity. For example, the real-time inventory may specify, for each pallet, which type (or types, if there are multiple types) of item is arranged on the pallet, and how many of the type(s) of items are on the pallet (e.g., nine items of type A on pallet X, twelve items of type B on pallet Y). Additionally or alternatively, the real-time inventory may specify relationships between items, such as whether two or more items are complementary. Examples of items that are complementary may include DVD players and DVDs, a printer and ink cartridges, or computer hardware and computer software, among other possibilities. Complementary parts may be deemed "complementary" to various degrees. For instance, in some cases, car batteries and brake pads may be deemed complementary, but in other cases they may not (but in those other cases, car batteries and car spark plugs may be deemed complementary instead). As such, the real-time inventory may specify whether a single pallet includes two or more complementary items (e.g., a single pallet includes both DVDs and DVD players). Additionally or alternatively, the real-time inventory may specify whether two or more pallets include complementary items (e.g., a first pallet includes printers and a second pallet includes ink). Other examples are possible as well.

At block 302, the method involves, based on the real-time item information, identifying a set of two or more pallets of which at least one pallet includes less than a threshold quantity of a type of item.

Within examples, the WCS may require that, in order for the WCS to include a pallet in the identified set, the pallet must be able to be combined with at least one other pallet in the set. In other words, if a given pallet is at a predetermined capacity, it may not be included in the set. Within additional examples, the WCS may require that every pallet of the identified set include less than the threshold quantity of the item type, rather than just at least one pallet. For instance, the WCS may not include a pallet in the identified set unless that pallet has less than the threshold quantity of the item type. Within additional examples, the WCS may include in the identified set only enough pallets to fill up a single pallet without exceeding a predetermined capacity. Further, the WCS may include in the identified set only pallets that, when combined, would be closest to a predetermined capacity. For instance, given a capacity of ten, a first pallet with two items, a second pallet with five items, and a third pallet with five items, the WCS may identify the second and third pallets to combine, but not the first pallet. Other examples are possible as well.

Within examples, the threshold quantity may apply on a per item type basis. For instance, the WCS may not condense pallets of a first type of item unless each of those pallets have less than a first threshold quantity of the first type of item, and may not condense pallets of a second, different type of item unless each of those pallets have less than a second, different threshold quantity of the second type of item. Within additional examples, the threshold quantity may apply across multiple groups of items, where each group includes multiple types of items. Within further examples, the threshold quantity may apply to all items in the warehouse, regardless of type.

Although the description herein primarily focuses on condensing pallets of items of the same type, it should be noted that, in some implementations, the WCS may identify a set of two or more pallets that include items that are not the same and then take actions to condense those pallets. By way of example, the WCS may identify a set of two or more pallets that include less than a threshold quantity of complementary items. For instance, given a threshold quantity of four, the WCS may (i) identify a first pallet that has two of a first type of item, (ii) identify a second pallet that has one of a second type of item that the real-time inventory indicates as complementary to the first type of item, and then (iii) take actions to condense the first and second pallets into a single pallet.

Additionally or alternatively to the WCS using item type as criteria for identifying pallets to condense, the WCS may use other criteria. For example, the WCS may use shipping expectations to identify and condense pallets that have different types of items, but where the different types of items are all scheduled to be shipped from the warehouse at the same time (e.g., in the same shipping container, in the same truck, etc.). As another example, the real-time item information may include expiration dates of each item and/or lot numbers of each item, and the WCS may use such expiration dates and/or lot numbers to identify and condense pallets that have the same type of item of item or different types of items. As a more particular example, the act of the WCS identifying pallets to condense may involve the WCS identifying a set of pallets of which at least one pallet includes less than a threshold quantity of a type of item, and that each also include (i) items of the type that have the same expiration date and/or (ii) items of the type that have the same lot number.

Further, the WCS's identification of pallets for condensing may be affected by factors such as business goals and seasonality of items. For example, a website may promote same-day delivery for orders of certain items, and therefore the WCS may target promoted items for condensing, as those items may need to be shipped out faster than other items that could be the subject of pallet condensing. As another example, certain items may be targeted for condensing when they are in-season, and may be targeted over items that are out of season. For instance, in the winter, the WCS may identify pallets of items such as snow boots to condense, but may not identify pallets of items such as swimsuits.

In some implementations, the act of the WCS identifying pallets to condense into a single pallet may involve the WCS determining multiple candidate sets of pallets based on any one or more of the criteria discussed herein and then selecting one or more of the candidates to be the pallets to condense. The act of the WCS selecting one or more of the candidates to be the pallets to condense may be based on the WCS comparing various considerations, such as whichever sets of pallets will take the least amount of time to for the robotic devices to condense, the availability of robotic devices to perform the condensing, and/or whether there is an urgent need to condense the pallets. For instance, there may be a scenario where condensing a first candidate set of pallets better fits the needs for current and/or forecasted receiving and shipment of items at the warehouse than condensing a second candidate set of pallets, but takes a longer amount of time to condense than the second candidate set of pallets. In that scenario, if there is an urgent need to condense pallets and make room in the warehouse, such as an urgent instruction from a human operator requiring condensing as soon as possible and/or the WCS detecting that floor space in the warehouse allocated for pallets is filled up or nearly filled up, the WCS may select the second candidate set of pallets instead of the first candidate set of pallets. On the other hand, if there is an urgent upcoming shipment for a type of item contained on the first candidate set of pallets, the WCS may select the first candidate set of pallets despite the longer amount of time to condense, provided that the first set of pallets will be condensed in time for the upcoming shipment. Other considerations for identifying and selecting pallets for condensing are discussed later in this description.

With regard to warehouse 100 shown in FIG. 1, example candidate sets of pallets for condensing may include any combination of pallet 126, pallet 128, pallet 130, and pallet 132. For instance, the WCS may identify pallet 130 and pallet 132 as a candidate pair of pallets to condense, but may not ultimately select them to condense into a single pallet because condensing them may result in a single pallet that exceeds its capacity. Rather, the WCS may identify pallet 126 and pallet 130 as candidates for condensing, and may then select them to condense. Other example combinations are possible as well.

Having identified pallets for condensing, the WCS may next determine what resources are available for performing the condensing (e.g., retrieving the pallets, bringing them to a location, and condensing them at the location). In essence, the WCS may determine a cost function that considers what else is going on in the warehouse and can thus identify various information, such as which robotic devices are available to assist in the condensing, what time is best to perform the condensing, how long the condensing might take to perform, what the priority level should be for performing the condensing with respect to other scheduled or ongoing tasks, etc.

To facilitate this, at block 304, the method involves receiving real-time robotics information relating to a plurality of robotic devices positioned in the warehouse. In some examples, the real-time robotics information may include (i) real-time locations of the plurality of robotic devices as positioned in the warehouse, (ii) real-time task progress data for the plurality of robotic devices, (iii) a schedule for performance of the tasks, and (iv) time measurements for one or more of the plurality of robotic devices to perform the tasks. The tasks may include tasks that are in-progress and/or tasks that are scheduled to be completed.

A time measurement for performance of a given task can take various forms. Within examples, a time measurement for a given task may be fixed or known. For instance, unless an unforeseen issue arises (e.g., an obstacle blocks a robotic device's path, or a robotic device is damaged), the WCS will expect that the task will take an amount of time (e.g., the task of bringing a pallet from one end of the warehouse to the other will take five minutes). Within other examples, a time measurement for a given task may be variable to account for changes to the task (e.g., if an unforeseen issue arises, or if a trajectory needs to be adjusted), and thus the WCS or other entity may periodically or continuously update the variable time measurement based on the progress of the task. Other examples are possible as well.

Within examples, the real-time robotics information may also include default trajectories or adjusted trajectories for each of the robotic devices involved in a task or to-be-involved in a task. In this manner, the WCS may maintain or have access to a virtual map that indicates where in the warehouse the robotic devices trajectories will take them during the tasks.

Within additional examples, the real-time robotics information may also include the type of robotic device (e.g., forklift, multi jointed arm, whether the robotic device is static or mobile), and may further include the types of components that each robotic device has. For instance, the information may identify the type of mechanism the robotic device has for transporting items/pallets, such as a gripper (e.g., magnetic, fingers). Factors such as the robotic device type can identify aspects that may help or hinder the robotic device's usefulness in condensing sets of pallets, and may thus either lengthen or shorten the total amount of time taken to condense the sets of pallets.

Within additional examples, the real-time robotics information may also include the battery levels of each robotic device, as the remaining battery level of a given robotic device may factor into the WCS's decision of whether to select the given robotic device for the performance of a task and/or the WCS's decision of how the given robotic device will assist in the performance of the task.

Generally, the task progress data may include data interpretable by the WCS as an indication of a current state of robotic devices in the warehouse, including one or more robotic devices involved in a performance of a task, or performance of a phase of a task when a task involves multiple task phases. Within examples, the task progress data may include a time at which a task or task phase was completed, and the robotic device that completed the task or task phase may transmit the task progress data to the WCS at the completion time or within a predetermined time window after the completion time. The task progress data may also indicate where the robotic device is/was when the task or task phase is/was completed, and may also indicate where other robotic devices and objects (e.g., other robotic devices, items, pallets, etc. that were involved in a performance of the task or task phase) are located in the warehouse and/or indicate a predicted future location representative of where the other robotic devices, items, pallets, etc. are travelling towards in the warehouse. Further, the task progress data may indicate a current configuration of a given robotic device, such as a set of joint variables of the given robotic device, a configuration of one or more robotic appendages of the given robotic device, and a heading of the given robotic device. Still further, the task progress data may indicate a current status of one or more robotic devices, such as a battery power level of a given robotic device or other diagnostic information, and/or information indicating a robotic appendage of the given robotic device that is not functioning correctly. It should be understood that information which may be indicated by the task progress data, including the information described above, may alternatively be transmitted to the WCS at another time separate from the transmission of the task progress data.

Within examples, to facilitate performance of tasks throughout the warehouse, including a task of condensing sets of pallets, the WCS may periodically determine a prioritization of scheduled tasks and/or a prioritization of ongoing tasks. For instance, the WCS may assign to each task a priority level based on various considerations such as those discussed above (e.g., business goals, received orders). For instance, the task of condensing of pallets may have a lower priority level than the priority levels of tasks associated with fulfilling orders. Such priority levels can be adjusted based on changing conditions. For example, the WCS may cancel the condensing of pallets in the middle of the condensing process (or de-prioritize the condensing if the task was scheduled but has not yet occurred) if the WCS determines that resources are needed for performing a different, more important/urgent task. As another example, if the WCS expects a large order for items, it may become more urgent to clear more space in the warehouse for the larger order of items to be placed, and thus the WCS may assign a higher priority (e.g., highest priority) to the task of condensing pallets throughout the warehouse. Other examples are possible as well.

At block 306, the method involves, based on the real-time item information and the real-time robotics information, determining an amount of time to condense the items on the set of pallets into a single pallet by the plurality of robotic devices.

At block 308, the method involves, based on the real-time item information and the real-time robotics information, determining a quantity of pallets that will become empty as a result of condensing the items on the set of pallets into the single pallet.

At block 310, the method involves causing one or more of the plurality of robotic devices to condense the items on the set of pallets into the single pallet based on the amount of time being less than a threshold amount of time and further based on the quantity of pallets that will become empty being greater than a threshold quantity of pallets.

In some implementations, before determining how long the task of condensing the set of pallets will take, the WCS may use the real-time robotics information to review ongoing and scheduled tasks in the warehouse and determine robotic device availability for the task of condensing the set of pallets based on that review, thus determining which robotic devices can fit at least a portion of the task of condensing into their schedule. As an example, in line with the discussion above, once a robotic device completes a task, it may notify the WCS that it has completed the task, and may then engage in another scheduled task for which it will travel along a trajectory to another side of the warehouse. The WCS may determine that there is sufficient time in order for the robotic device to assist with the condensing along its way to the other side of the warehouse, such as by retrieving a pallet proximate to the trajectory and bringing it to a condensing station. Other examples are possible as well.

The determined amount of time may include the respective amounts of time for the robotic devices to perform one or more of the following actions: (i) retrieving the identified pallets from their current locations, (ii) bringing the identified pallets to a location for condensing, (iii) condensing the identified pallets into a single pallet, and/or (iv) and bringing the single pallet to a new location (e.g., loading the single pallet onto a truck or placing the single pallet in storage). The determined amount of time may include the time for performing other actions as well.

Further, the determined amount of time to condense the set of pallets may be exact (provided that the WCS has access to more precise robotic device task progress, location, and availability, for instance) or may be an estimate. If other activities are ongoing in the warehouse that could possibly impact the time taken to condense the set of pallets, the WCS may not be able to determine an exact time. However, if many robotic devices are not currently engaged in tasks or will not be engaged in tasks over a period of time (e.g., overnight), the WCS may be able to determine an exact time.

The WCS may perform the acts of identifying a set of pallets to condense and/or causing the robotic devices condense the set of pallets based on one or more of a variety of conditions being met. As noted above, one such condition is whether a threshold quantity of pallets in the warehouse will become empty as a result of the condensing, as noted above. Within examples, the WCS may not instruct the robotic devices to condense the set of pallets unless at least two pallets will become empty as a result of the condensing. Within additional examples, the WCS may view this condition on a larger scale, as there may be scenarios in which it is desirable to create much more space on the floor, in pallet racks, or in pallet stacks of the warehouse. For instance, the WCS may not instruct the robotic devices to condense multiple different sets of pallets into respective single pallets unless a larger number of pallets will become empty (e.g., fifty pallets).

As another example condition, the WCS may look to whether a high number of the type of item is expected to be shipped soon. To facilitate this, as noted above, the WCS may determine an item shipment expectation and use the item shipment expectation to determine a quantity of the type of item expected to be shipped. If the determined quantity is above a threshold shipment quantity, the WCS may instruct the robotic devices to condense the set of pallets into a single pallet. In this manner, the WCS may be aware of and/or anticipate shipments of items for which it may be desirable to have pallets at or near capacity of an item. For instance, in scenarios where there are not as many at-capacity pallets of the item as desired for the shipment, the WCS can instruct robotic devices to gather various pallets of the item to condense in preparation for the shipment.

Similarly, the WCS may use the item shipment expectation to determine that an upcoming shipment requires a predetermined quantity of the type of item on a single pallet. In other words, the WCS may determine that, on any given pallet for the upcoming shipment, there cannot be less than a certain quantity of items, and thus pallets should be condensed so that each shipped pallet has at least that certain quantity of items. If the WCS makes this determination, the WCS may responsively then instruct the robotic devices to condense the set of pallets.

As another example condition, the WCS may use the item shipment expectation to determine how much storage capacity (i.e., storage space) would be required for items that the WCS expects to be received at the warehouse. If the determined storage space is above a threshold storage capacity, the WCS may instruct the robotic devices to condense the set of pallets. Such a threshold storage capacity may represent the amount of free space currently in the warehouse, and thus if the determined storage space is above that threshold, the WCS may decide to make more room in the warehouse. For instance, given an example threshold of two thousand square feet, the WCS may be aware of or predict that there is an upcoming delivery of one thousand of a type of item and, based on that number, determine an amount of storage space that would be needed to accommodate pallets of the one thousand items (e.g., five hundred pallet rack positions, three thousand square feet, or other manners of quantifying required storage space). The WCS may then instruct the robotic devices to condense pallets because the required storage space exceeds the threshold of two thousand square feet.

Similarly, the WCS may use the pallet locations indicated by the real-time item information as well as other information such as pallet dimensions of the pallets in the warehouse to determine how much space is taken up in the warehouse by the identified set of pallets. If the amount of space is greater than a predetermined threshold amount of space, the WCS may instruct the robotic devices to condense the set of pallets. The threshold amount of space which may vary depending on the dimensions of the pallets of the set.

As another example condition, the WCS may not condense the set of pallets unless some or all of the pallets in the set of pallets are within a threshold distance from a shipping dock in the warehouse (e.g., shipping dock 110).

As another example condition, the WCS may not instruct the robotic devices to condense the set of pallets if there is not much time until the set of pallets are due to be shipped out, emptied, or otherwise no longer present a disadvantage to the warehouse. In other words, the WCS may not instruct the robotic devices to condense the set of pallets if the space taken up by some or all of the set of pallets would become available sooner (as a result of depleting the pallets naturally) than if the robotic devices condensed the set of pallets. For instance, the WCS may use any records/histories, scheduled task information, or other information discussed above to estimate an amount of time until the set of pallets will be depleted a result of warehouse activities other than condensing items (e.g., loading full or less-than-full pallets onto trucks for shipping). If the estimated amount of time is greater than how long it would take for the robotic devices to complete the condensing of the set of pallets, then the WCS may decide to instruct the robotic devices to condense the set of pallets. But if it would likely take the robotic devices longer to condense the set of pallets than it would take for the set of pallets to no longer present a disadvantage to the warehouse, the WCS may instead decide to not instruct the robotic devices to condense the set of pallets (or may cancel the condensing if the task of condensing is already underway). In other implementations, the WCS may not compare the estimated amount of time to the determined time for the robotic devices to condense the set of pallets, and may rather compare the estimated amount of time to a threshold. For example, if the time it would take for the set of pallets to no longer present a disadvantage to the warehouse is longer than twenty-four hours, the WCS may decide to instruct the robotic devices to condense the set of pallets. Other examples are possible as well.

Similarly, if the WCS determines that the set of pallets will be depleted soon as a result of other warehouse activities (e.g., activities other than condensing pallets), the benefit to condensing the set of pallets may be to gain additional storage space in the warehouse earlier by condensing the set of pallets before the set of pallets would have otherwise been depleted. As such, the WCS may weigh this option against the option of merely waiting for the set of pallets to be depleted by other warehouse activities. In particular, the WCS may determine whether the value of waiting for the set of pallets to be depleted by other warehouse activities outweighs the value provided by condensing the set of pallets and gaining additional storage space for the amount of time between the time condensing ends and the time the set of pallets would have been depleted by other warehouse activities.

In some implementations, the WCS may choose one or more robotic devices to take part in the task of condensing if the robotic device(s) is/are within a threshold distance from a condensing station and/or within a threshold distance from the locations of the identified set of pallets, thereby potentially reducing the amount of time it might take for the chosen robotic device(s) to bring the set of pallets to the condensing station and in turn reducing the total amount of time for the task of condensing the set of pallets. The WCS may then instruct the chosen robotic device(s) to retrieve the set of pallets and bring them to the condensing station.

The condensing station may be designated and fixed in the warehouse (e.g., condensing station 134) or may be determined on the fly, such that certain areas of the warehouse can be used as somewhat-impromptu, makeshift condensing station that is optimal for the given situation. If the condensing station is fixed, the WCS may receive or otherwise access information indicating the location of the condensing station (e.g., a map of the warehouse) to facilitate instruction to the robotic devices to condense the set of pallets. On the other hand, the WCS may use the real-time item information and the real-time robotics information to determine an optimal condensing station location in the warehouse at which to condense the set of pallets, such as a location that is (i) within a threshold distance from a shipping dock, (ii) within a threshold distance from the locations of set of pallets, and/or (iii) within a threshold distance from the trajectories of robotic devices that might be available to assist with the condensing before, after, or during performance of another task of theirs. The WCS may then provide the location of the optimal condensing station to the robotic devices as part of the instructions to condense the set of pallets. In some instances, the WCS may first schedule a time interval for the condensing of the set of pallets and then determine the optimal condensing station location to be within a threshold distance from one or more of the respective trajectories along which one or more robotic devices will be travelling before the scheduled time interval.

In some implementations, the WCS may consider the real-time robotics information and/or other scheduled warehouse activities to determine a time interval during which to condense pallets in the warehouse, and may thus instruct the robotic devices to condense pallets during the time interval. For example, the WCS may determine that it will take the robotic devices one hour to condense one or more identified sets of pallets and may identify a one hour window in the following twenty four hours during which to condense the set(s) of pallets.

In similar implementations, the WCS may consider the real-time robotics information and/or other scheduled warehouse activities to allocate an interval of time for a recurring condensing of pallets. At least some of the operations discussed herein may then be performed on a periodic basis at the allocated time interval. For instance, if less warehouse activities occur overnight during a seven hour period of time, the WCS may determine that the WCS should take actions to identify potential sets of pallets to condense, and take those actions every night during that seven hour period, every other night during that period, or every Sunday during that period.

Figure 4B:
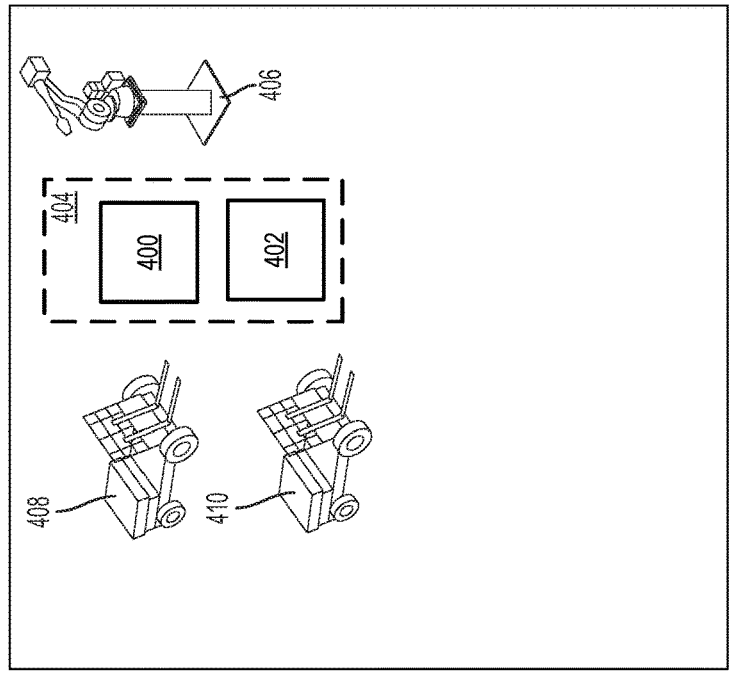
FIGS. 4A, 4B, and 4C illustrate example operation of robotic devices in a warehouse, in accordance with at least some implementations described herein.
Figure 4A:
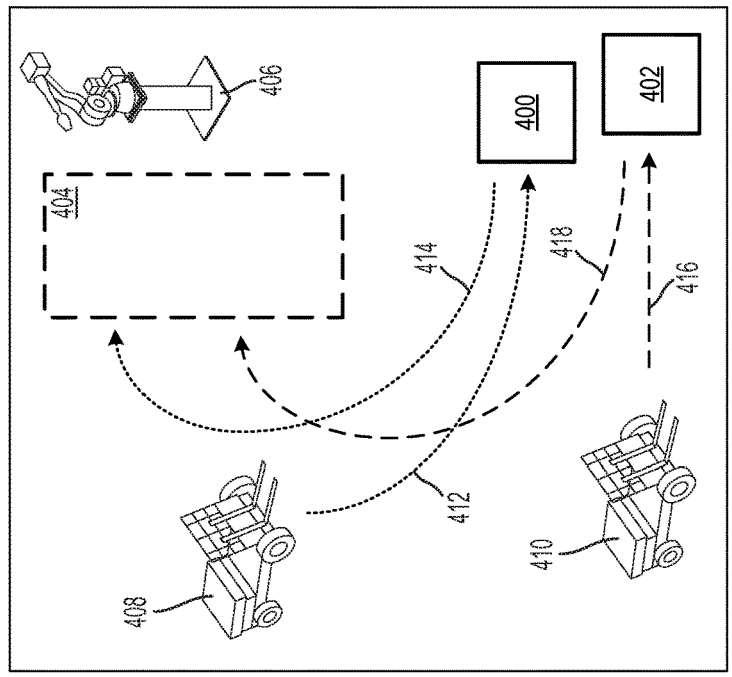
Figure 4C:
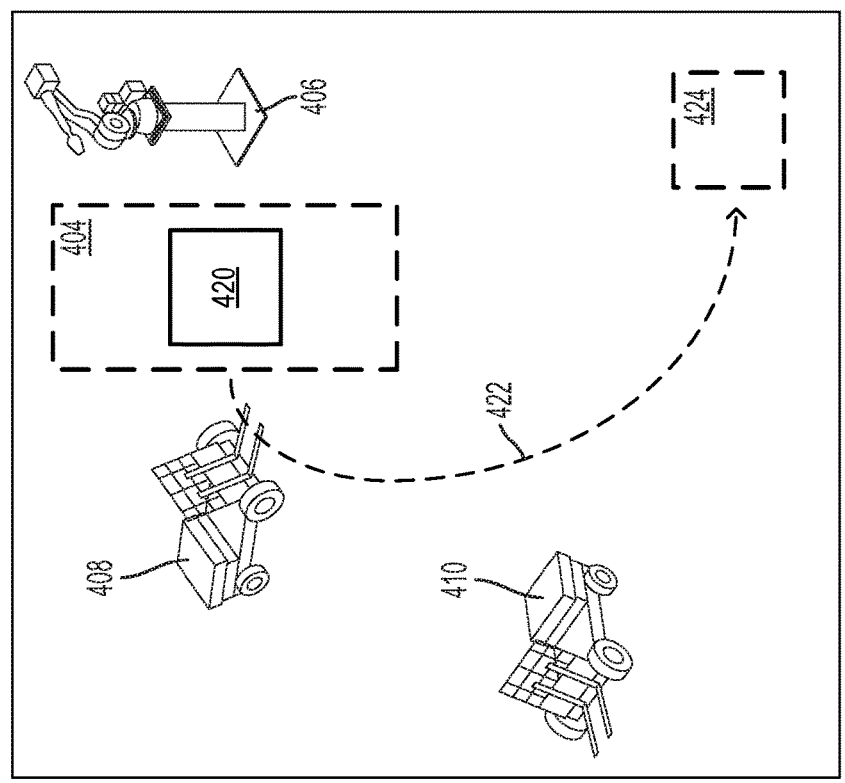

FIGS. 4A, 4B, and 4C illustrate example operation of robotic devices in a warehouse, in accordance with at least some implementations described herein. In particular, FIGS. 4A, 4B, and 4C illustrate moments in time during a condensing process.

As shown in FIG. 4A, there are two pallets, pallet 400 and pallet 402, that may together make up an identified set of pallets or may be two members of a larger set of pallets. FIG. 4A also shows a condensing station 404 and a pedestal robot 406, such as the pedestal robot 112 described with regard to FIG. 1, which may be configured to assist with the process of condensing items on pallets into single pallets, and which the WCS may instruct to assist with the task. Further, FIG. 4A shows two autonomous fork trucks, fork truck 408 and fork truck 410, that the WCS has instructed to assist with the task of condensing pallet 400 and pallet 402. As such, fork truck 408 may travel along dotted path 412 to retrieve pallet 400, and then travel along dotted path 414 to deliver pallet 400 to condensing station 404. In addition, fork truck 410 may travel along dashed path 416 to retrieve pallet 402, and then travel along dashed path 418 to deliver pallet 402 to condensing station 404. FIG. 4B shows both pallet 400 and pallet 402 at condensing station 404. In practice, the WCS may instruct pedestal robot 406 to condense pallet 400 and pallet 402 into single pallet 420 shown in FIG. 4C. Further, as shown in FIG. 4C, the WCS may instruct fork truck 408 to travel along dashed path 422 to deliver pallet 420 to a predetermined location 424, and at some point may also instruct fork truck 410 to leave condensing station 404 resume a current task or begin a new task. Other example illustrations are possible as well.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
   identifying, by a warehouse control system (WCS), from a plurality of pallets positioned in a warehouse, a set of two or more pallets of which at least one pallet includes less than a threshold quantity of a type of item;
   determining an amount of time for at least one robotic device positioned in the warehouse to condense items on the set of pallets into a single pallet;
   determining a quantity of pallets that will become empty as a result of condensing the items on the set of pallets into the single pallet; and
   controlling the at least one robotic device to condense the items on the set of pallets into the single pallet based on the amount of time being less than a threshold amount of time and further based on the quantity of pallets that will become empty being greater than a threshold quantity of pallets.

2. The method of claim 1, further comprising:
   receiving, at the WCS, real-time item information including real-time locations of pallets positioned in a warehouse and real-time inventory of items arranged on the pallets,
   wherein the real-time inventory of the items includes a content of each pallet, and
   wherein identifying the set of pallets is based on the real-time item information.

3. The method of claim 1, further comprising:
   receiving, at the WCS, real-time item information including real-time locations of pallets positioned in a warehouse and real-time inventory of items arranged on the pallets,
   wherein the real-time inventory of the items includes a content of each pallet, and
   wherein determining the quantity of pallets that will become empty is based on the real-time item information.

4. The method of claim 1, further comprising:
   receiving, at the WCS, real-time robotics information relating to locations of the at least one robotic device and tasks for performance by the at least one robotic device,
   wherein determining the quantity of pallets is based on the real-time robotics information.

5. The method of claim 1, further comprising:
   receiving, at the WCS, real-time robotics information relating to locations of the at least one robotic device and tasks for performance by the at least one robotic device,
   wherein determining the amount of time is based on the real-time robotics information.

6. The method of claim 5, wherein the real-time robotics information includes task progress data for the tasks, a schedule for performance of the tasks, and expected times for completion of performance of the tasks.

7. The method of claim 1, further comprising:
   determining an item shipment expectation including a new item expected to be received at the warehouse at a future date and an item present at the warehouse marked for delivery at the future date; and
   based on the item shipment expectation, determining a quantity of the type of item expected to be shipped,
   wherein controlling the at least one robotic device to condense the items on the set of pallets into the single pallet is further based on the quantity of the type of item expected to be shipped being greater than a threshold shipment quantity.

8. The method of claim 1, further comprising:
  determining an item shipment expectation including a new item expected to be received at the warehouse at a future date and an item present at the warehouse marked for delivery at the future dates; and
  based on the item shipment expectation, determining an amount of storage capacity required for items expected to be received at the warehouse,
  wherein controlling the at least one robotic device to condense the items on the set of pallets into the single pallet is further based on the amount of storage capacity required for items expected to be received at the warehouse being greater than a threshold storage capacity.

9. The method of claim 1, further comprising:
  making a determination that an upcoming shipment requires a predetermined quantity of the type of item on the single pallet,
  wherein controlling the at least one robotic device to condense the items on the set of pallets into the single pallet is further based on the determination that the upcoming shipment requires the predetermined quantity of the type of item on the single pallet.

10. The method of claim 1, further comprising:
  determining an amount of space taken up in the warehouse by the set of pallets,
  wherein controlling the at least one robotic device to condense the items on the set of pallets into the single pallet is further based on the amount of space taken up in the warehouse by the set of pallets being greater than a threshold amount of space.

11. The method of claim 1, wherein the threshold amount of time is a first threshold amount of time, the method further comprising:
  estimating an amount of time until the set of pallets become empty as a result of warehouse activities other than condensing the items on the set of pallets into the single pallet,
  wherein controlling the at least one robotic device to condense the items on the set of pallets into the single pallet is further based on the estimated amount of time until the set of pallets become empty being greater than a second threshold amount of time.

12. The method of claim 1, further comprising:
  estimating an amount of time until the set of pallets become empty as a result of warehouse activities other than condensing the items on the set of pallets into the single pallet,
  wherein controlling the at least one robotic device to condense the items on the set of pallets into the single pallet is further based on the amount of time being less than the estimated amount of time until the set of pallets become empty.

13. The method of claim 1, further comprising:
  based on scheduled warehouse activities, allocating a time interval for recurring condensing of items on pallets to single pallets,
  wherein at least a portion of the method is periodically performed at the allocated time interval to condense items on pallets to single pallets.

14. A non-transitory computer-readable medium having stored thereon program instructions that when executed by a computing system that includes at least one processor cause the computing system to perform operations comprising:
  identifying, from a plurality of pallets positioned in a warehouse, a set of two or more pallets of which at least one pallet includes less than a threshold quantity of a type of item;
  determining an amount of time for at least one robotic device positioned in the warehouse to condense items on the set of pallets into a single pallet;
  determining a quantity of pallets that will become empty as a result of condensing the items on the set of pallets into the single pallet; and
  controlling the at least one robotic device to condense the items on the set of pallets into the single pallet based on the amount of time being less than a threshold amount of time and further based on the quantity of pallets that will become empty being greater than a threshold quantity of pallets.

15. The non-transitory computer-readable medium of claim 14, the operations further comprising:
  receiving real-time item information including real-time locations of pallets positioned in a warehouse and real-time inventory of items arranged on the pallets,
  wherein the real-time inventory of the items includes a content of each pallet, and
  wherein identifying the set of pallets is based on the real-time item information.

16. The non-transitory computer-readable medium of claim 14, the operations further comprising:
  receiving real-time item information including real-time locations of pallets positioned in a warehouse and real-time inventory of items arranged on the pallets,
  wherein the real-time inventory of the items includes a content of each pallet, and
  wherein determining the quantity of pallets that will become empty is based on the real-time item information.

17. The non-transitory computer-readable medium of claim 14, the operations further comprising:
  receiving real-time robotics information relating to locations of the at least one robotic device and tasks for performance by the at least one robotic device,
  wherein determining the quantity of pallets is based on the real-time robotics information.

18. The non-transitory computer-readable medium of claim 14, the operations further comprising:
  receiving real-time robotics information relating to locations of the at least one robotic device and tasks for performance by the at least one robotic device,
  wherein determining the amount of time is based on the real-time robotics information.

19. A system comprising:
  at least one robotic device;
  at least one processor; and
  data storage comprising instructions executable by the at least one processor to cause the system to perform operations comprising:
    identifying, from a plurality of pallets positioned in a warehouse, a set of two or more pallets of which at least one pallet includes less than a threshold quantity of a type of item;
    determining an amount of time for the at least one robotic device positioned in the warehouse to condense items on the set of pallets into a single pallet;
    determining a quantity of pallets that will become empty as a result of condensing the items on the set of pallets into the single pallet; and
    controlling the at least one robotic device to condense the items on the set of pallets into the single pallet based on the amount of time being less than a threshold amount of time and further based on the quantity of pallets that will become empty being greater than a threshold quantity of pallets.

20. The system of claim 19, the operations further comprising:
  receiving real-time item information including real-time locations of pallets positioned in a warehouse and real-time inventory of items arranged on the pallets, wherein the real-time inventory of the items includes a content of each pallet; and
  receiving real-time robotics information relating to locations of the at least one robotic device and tasks for performance by the at least one robotic device,
  wherein identifying the set of pallets is based on the real-time item information, and
  wherein determining the amount of time is based on the real-time robotics information.

\* \* \* \* \*